United States Patent

Lacy

[11] Patent Number: 5,184,653
[45] Date of Patent: Feb. 9, 1993

[54] TOILET DOLLY

[76] Inventor: Danny Lacy, 9210 Harrogate Way, Elk Grove, Calif. 95758

[21] Appl. No.: 730,263

[22] Filed: Jul. 12, 1991

[51] Int. Cl.⁵ .................................. B65D 25/28
[52] U.S. Cl. ............................... 141/98; 4/661; 141/231; 141/364; 141/386; 220/DIG. 6; 269/15; 269/17; 280/47.34
[58] Field of Search ............... 220/573, DIG. 6; 269/15, 17; 414/332; 141/231, 364, 383, 386, 98; 4/661; 280/47.34

[56] References Cited

U.S. PATENT DOCUMENTS

| | | |
|---|---|---|
| 1,506,028 | 8/1924 | Perritt . |
| 1,554,589 | 9/1925 | Long . |
| 2,029,781 | 2/1936 | McLean .................. 141/231 X |
| 2,985,448 | 5/1961 | Hancock . |
| 3,262,590 | 7/1966 | Lynn . |
| 3,391,905 | 7/1968 | Burns . |
| 3,490,632 | 1/1970 | McKinney .................. 414/332 X |
| 3,944,199 | 3/1976 | Johnson .................. 269/15 |
| 4,010,942 | 3/1977 | Ward . |
| 4,140,306 | 2/1979 | Wheeler . |
| 4,392,552 | 7/1983 | Partridge .................. 220/573 X |
| 4,638,841 | 1/1987 | Heath .................. 141/98 |
| 4,722,511 | 2/1988 | Chitwood . |
| 4,775,067 | 10/1988 | Mount .................. 220/573 |
| 5,074,572 | 12/1991 | Delmerico et al. .................. 280/47.34 |

Primary Examiner—Joseph M. Gorski
Attorney, Agent, or Firm—James M. Ritchey

[57] ABSTRACT

Disclosed is a device for transporting and draining a toilet fixture comprising a generally hollow body containing a water reservoir. The body has a top panel with a toilet mount, a bottom panel with locking casters, a carrying handle, and a drain. Securing bolts are provided for anchoring the toilet to the toilet mount.

4 Claims, 3 Drawing Sheets

TOILET DOLLY

BACKGROUND OF THE INVENTION

1. Field of the Invention

Presented is an apparatus for assisting a user in transporting a toilet fixture. More specifically, disclosed is a low-profile dolly for moving and draining a previously installed and water filled toilet.

2. Description of the Background Art

Often during reconstruction of a bathroom temporary or permanent removal of a toilet fixture is required. Once the incoming water in disconnected and the storage tank of water is flushed the removal is initiated. However, even after flushing the water disconnected toilet a significant amount of water usually remains in the plubing below the toilet bowl. The toilet and the remaining water are relatively heavy and without a mechanical aid moving the toilet a even a short distance is somewhat difficult. Further, due to the remaining water in the toilet, care must be taken not to spill the water on carpets or other surfaces that might be damaged by a liquid.

Specifically, disclosed in U.S. Pat. No. 1,506,028 is a drain pan for collecting a liquid. Primarily used for catching automotive crank case oil, the device has a cylindrical chamber, an antisplash rim, a continually open drain secured to the rim, and two handles attached to the rim.

A portable oil drain pan is related in U.S. Pat. No. 1,554,589. A rectangular, enclosed chamber has a funnel as an integral portion of the chamber's top surface. A positioning tongue is secured to the pan, as are, preferably, three casters. Located immediately below the funnel, in a side wall, is a plugable drain pipe.

U.S. Pat. No. 2,985,448 describes a stand for automotive engines and the like. An engine mounting bracket is secured within a supporting stand. Provided in the bottom of the stand is a drain pan for collecting excess oil.

Explained in U.S. Pat. No. 3,262,590 is a lifting device for plumbing fixtures. An inverted U-shaped frame is fitted with floor wheels and a screw driven lifting member. Associated with the lifting member is a clamping mechanism the anchors to the toilet bowl rim. A jack is disclosed the elevates entire device to permit a user to tilt the toilet away from the floor.

U.S. Pat. No. 3,391,905 discloses a toilet bowl handling and transporting apparatus. A C-shaped lower support is fitted with wheels and a vertical, threaded lifting mechanism. Projecting from the lifting mechanism is a clamp containing arm for securing to the rim of a toilet. After securing to the rim, the arm and toilet are raised by means of the threaded lifting mechanism.

A repair support assembly for automotive transmissions is explained in U.S. Pat. No. 4,010,942. A wheeled mounted base is fitted with a drain pan and a vertical support member. Projecting from the vertical support is a clamping member for securing the transmission. A very similar device is related in U.S. Pat. No. 4,140,306.

Like '905 described above, U.S. Pat. No. 4,722,511 discloses a toilet lift truck. Provided is a C-shaped base having wheels and a vertical support member. Two movable horizontal arms project from the support member. A screw mechanism moves the arms up and down. The arm have clamping means for securing to the bowl.

The subject device greatly reduces the required effort in moving the toilet by providing an easily movable low platform on which to place the toilet. Additionally, within the subject platform is a water reservoir for collecting the excess water.

SUMMARY OF THE INVENTION

An object of the present invention is to provide an apparatus for transporting a toilet that allows a user to lift the toilet a minimal distance before wheeling the toilet to a desired location.

A further object of the present invention is to produce an apparatus for transporting and draining a toilet.

An additional object of the present invention is to furnish a toilet transportation and drainage apparatus that is light weight and simple in construction.

Another object of the present invention is to introduce a toilet transportation and drainage apparatus that enables a user to quickly and easily secure the toilet to the apparatus to prevent water leakage.

Disclosed is a device for transporting and draining a toilet fixture having a pedestal base with a floor mounting surface having a flush water port exiting through the floor mounting surface and at least one floor bolt receiving aperture piercing the base. The subject device comprises a generally hollow body surrounding a water reservoir. The body has a top panel with upper and lower surfaces completely penetrated by a water reservoir entrance, a bottom panel with upper and lower surfaces, and a perimeter side wall with inner and outer surfaces. The perimeter side wall spans and connects the top and bottom panels.

A plurality of locking casters are secured to the bottom panel lower surface. Further, a toilet mount for contacting the pedestal base floor mounting surface is fastened to the body top panel. The toilet mount comprises a perimeter flange having upper and lower surfaces joined to an open centered ring. The ring is fitted within the top panel water reservoir entrance with the lower flange surface contacting the top panel upper surface. Means are provided for securing the pedestal base to the toilet mount, whereby when the pedestal base mounting surface contacts the flange upper surface the flush water port aligns with the water reservoir entrance.

Other objects, advantages, and novel features of the present invention will become apparent from the detailed description that follows, when considered in conjunction with the associated drawings.

DESCRIPTION OF THE PREFERRED EMBODIMENT

Figure 1:
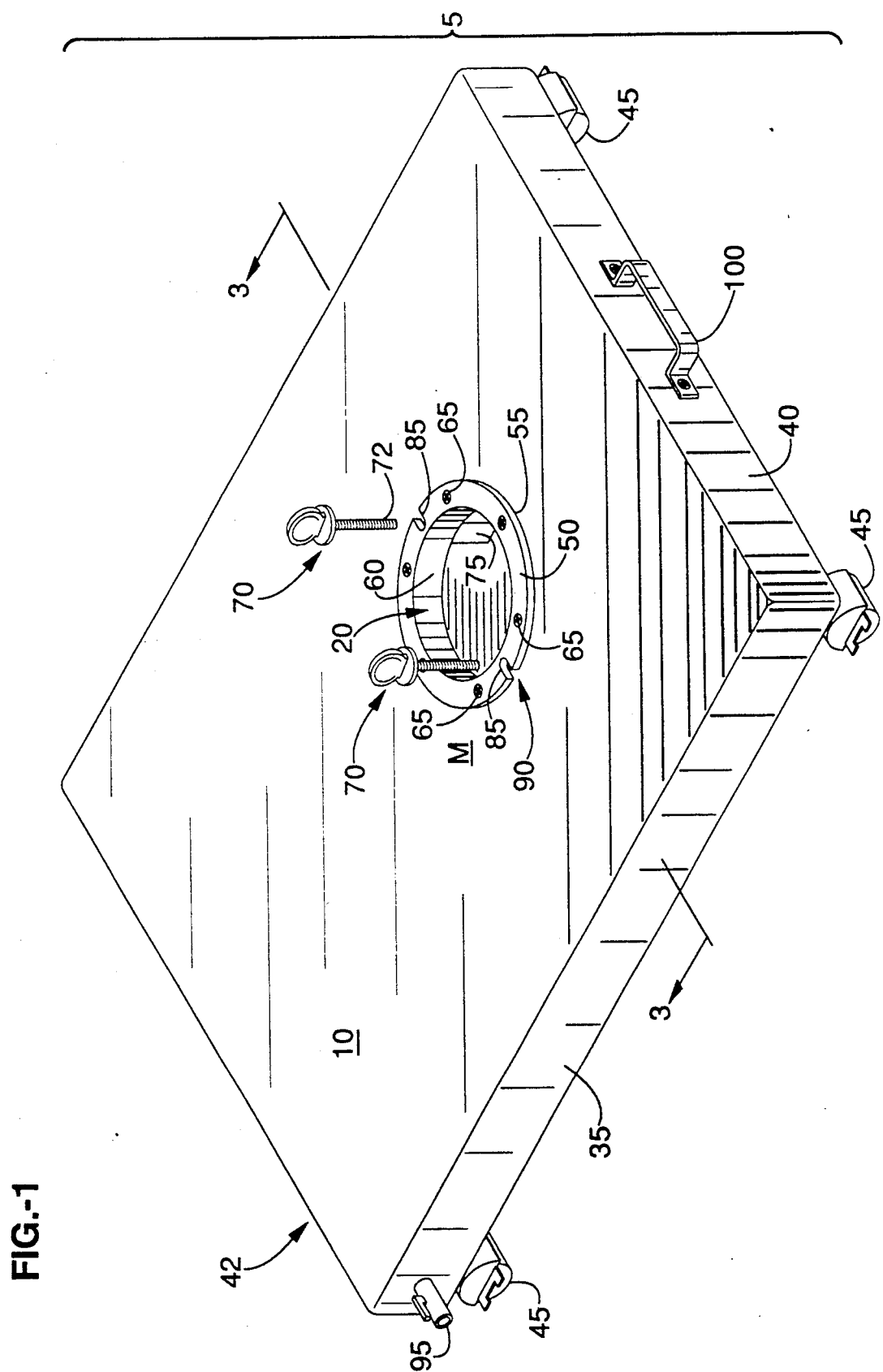
FIG. 1 is a perspective view of the subject apparatus fitted with a toilet fixture.
Figure 2:
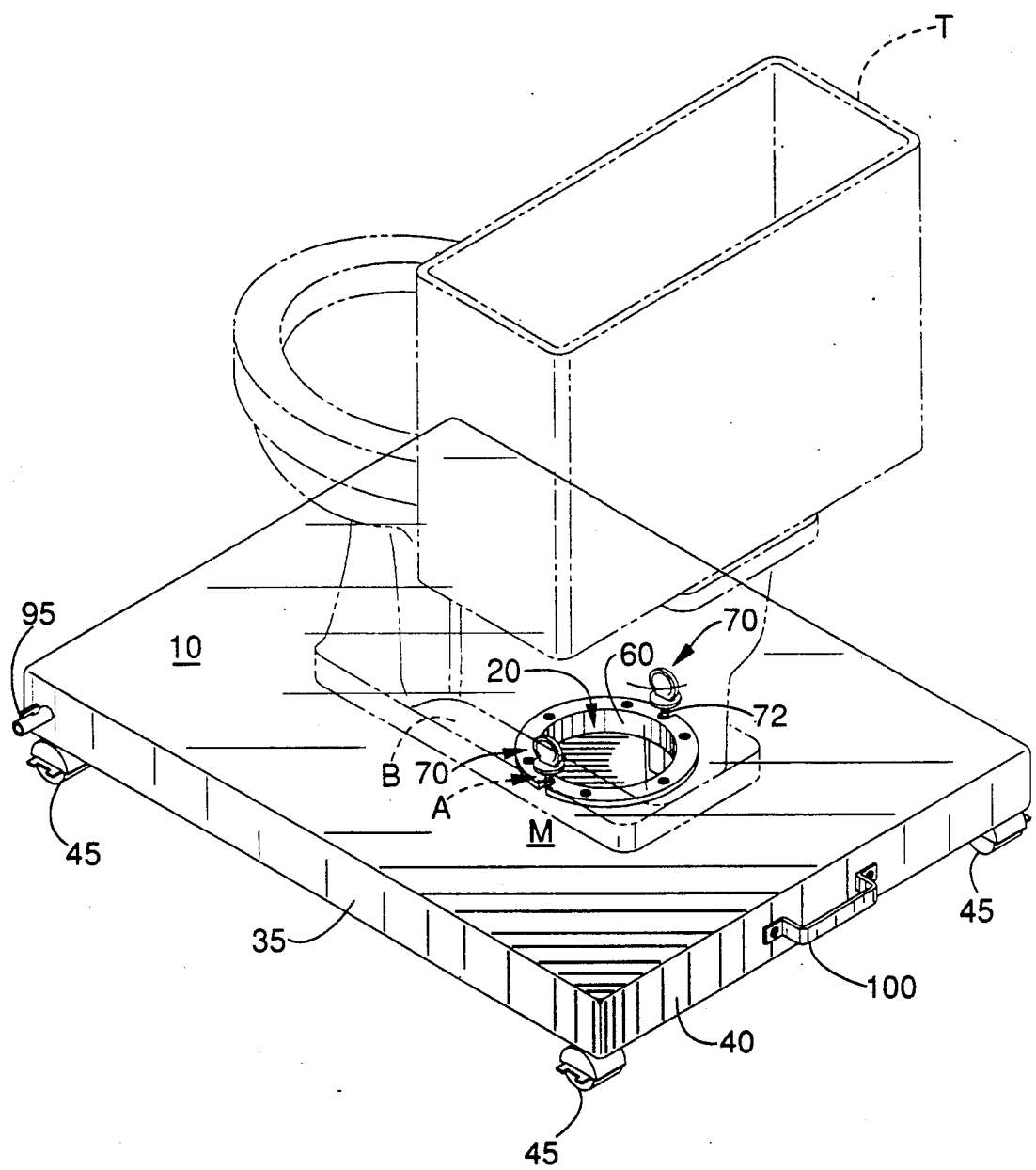
FIG. 2 is a perspective view of the subject apparatus.
Figure 3:
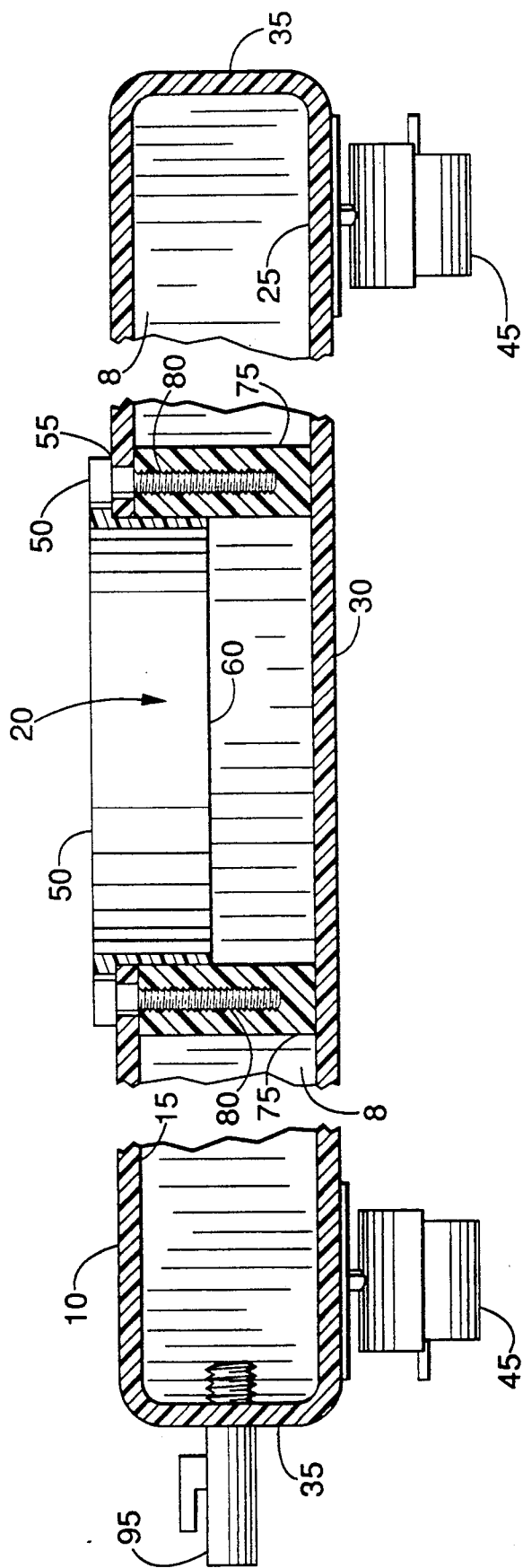
FIG. 3 is a cross sectional view of the subject apparatus taken along line 3—3 in FIG. 2.

Referring now to FIGS. 1-3, there is shown a preferred embodiment of a toilet dolly. The subject toilet dolly is employed by a user to transport and drain any general type of toilet. Usually, toilet fixtures are constructed with common features such as a water tank (see T in FIG. 2), inlet plumbing have an on-off valve, a flush mechanism, a bowl, and a pedestal base (see B in FIG. 2). The base has internal plumbing for delivering the flushed water into the building's plumbing. Specifically, the lower surface of the toilet's pedestal base has a floor mounting surface (see M in FIG. 2) penetrated by a flush water port, from the bowl, that mates with the building's waste water plumbing.

Mounted in the floor of the building (fastened to the drain pipe) is a flanged ring (commonly called a closet flange or Hurco ring) to which the base mounting surface contacts. To prevent water leakage a wax seal is pressed between the base mounting surface and the flanged ring. At least one (usually two) floor bolt receiving aperture pierces the base (see A in FIG. 2). Usually, floor bolts project up from the floor and through each floor bolt receiving aperture. A nut secures each bolt (generally two) to the base. Equivalent systems are well within the realm of this disclosure.

Most toilets are relatively heavy and thus moving one to a different location traditionally required significant effort and care not to spill the water. To minimize effort and water damage to surrounding floor materials the subject invention was devised. Comprising the subject device 5 is a generally hollow body surrounding a water reservoir 8. Although the body may be assembled by any number of standard techniques, a description of the body may be made in terms of an assembly of component thin panels secured together by standard techniques to form an essentially liquid tight structure. Plastics and metals, alone or in combination, are employed to construct the subject device.

The body comprises an elongated top panel with two side borders, first and second end borders, and upper 10 and lower 15 surfaces. A water reservoir entrance 20 completely penetrates the top panel. Preferably, the reservoir entrance 20 is located proximate the top panel's first end border. In addition to the top panel, the subject body comprises an elongated bottom panel with two side borders, first and second end borders, and upper 25 and lower 30 surfaces.

Additionally, a perimeter side wall spans and connects the top and bottom panels. Since the preferred shape of the body is generally a rectangular box-like structure, the perimeter side wall usually comprises two side walls 35. Each side wall 35 has an upper border, a lower border, and first and second end borders. Completing the preferred perimeter side wall are first 40 and second 42 end walls. Each end wall 40 has an upper border, a lower border, and two side borders. As indicated above, the top panel, bottom panel, and side walls are secured together (or formed as an intact whole during fabrication) to form the subject body. Preferably, each top panel border joins a side wall upper border, each bottom panel border joins a side wall lower border, the first end wall 40 upper border joins the top panel first end border, the first end wall 40 lower border joins the bottom panel first end border, the second end wall 42 upper border joins the top panel second end border, and the second end wall 42 lower border joins the bottom panel second end border to generate the essentially liquid tight water reservoir 8 within the body.

To permit a user to easily move a toilet attached to the subject device from one location to another, wheels, rollers, or casters 45 are secured to the bottom panel lower surface 30. The casters 45 are secured by appropriate standard methods such as gluing, welding, screwing, bolting, and the like. Since it is important (as described below is the section dedicated to the exact use of the subject device) that at times during the dolly's use it remain immobile on the supporting floor, the casters 45 include means for locking to prevent movement. Although the exact number and positioning of casters 45 can vary, usually four casters 45 are employed, one at each of the four bottom panel corners.

When a toilet fixture is placed on the body it fits on a toilet mount affixed in the subject body. Specifically, the toilet mount contacts the pedestal base floor mounting surface M. Preferably, the toilet mount is fastened to the body top panel proximate the first end wall 40. The toilet mount is similar or identical to the flanged ring, closet ring, or Hurco ring described above that is used to connect the building's drain plumbing to the base's mounting surface M. More specifically, the toilet mount comprises a perimeter flange having upper 50 and lower 55 surfaces joined to an open centered ring 60. The ring 60 is fitted within said top panel water reservoir entrance 20 with the lower flange surface 55 contacting the top panel upper surface 10. The toilet mount is anchored to the body by means of several openings in the flange fitted with securing screws or bolts 65.

Once the toilet is lifted onto the dolly body and positioned over the mounting flange, the body is secured to the toilet base B. It should be noted that when the pedestal base mounting surface contacts the flange upper surface 50, base interior flush water port aligns with the water reservoir entrance 20. Although equivalent means are considered to be within the purview of this disclosure, the preferred securing means comprises an anchor member 70 (usually a thumbscrew or thumbbolt having a male threaded region 72) and an anchor member receiver 75 (usually having a female threaded region 80) secured within the body. Generally, the anchor member receiver 75 is a block of suitable material attached to the top panel lower surface 15 and normally spans to proximate or contacting the bottom panel upper surface 25. The anchor member 70 passes through the pedestal base floor bolt receiving aperture A and through a passage 85 in the flange and a passage 90 in the top panel to engage the anchor member receiver 75 to secure the base B to the body.

After the excess flush water is transferred from the toilet into the subject water reservoir 8, that water needs to be drained from the reservoir 8. Although a user could drain the water through the water reservoir entrance 20, a drain 95 mounted in the body is useful. Specifically preferred is a drain 20 mounted in the body proximate the second end wall 42 that penetrating into the water reservoir 8. Usually, the drain 95 includes an open-shut valve.

To carry the subject device, either filled with water or empty a handle 100 is provided. Desirably, the carrying handle 100 is secured proximate the first end wall 40.

A user employing the subject device has a number of options concerning the exact sequence of use, however, the following description includes a general scheme using the subject device in transporting and draining a toilet. A user disconnects the toilet, including shutting off the incoming water and flushing the tank T. The toilet dolly is positioned near the toilet. The casters 45 are locked to prevent movement of the toilet dolly. Next the toilet is lifted onto the toilet dolly and anchored to the toilet dolly by the securing means. To remove the remaining water in the toilet, the toilet and toilet dolly are tilted to allow the excess water to transfer from the toilet into the water reservoir 8 through the flanged ring. The casters 45 are then unlocked and the combined toilet and dolly rolled to a desired location. If the user wishes the toilet and dolly may then be rolled to a location for toilet installation or storage. At this point if the toilet is to be reinstalled, the initial toilet loading steps are repeated essentially in reverse to unload the toilet. Usually, after movement to the desired location, the casters 45 are locked and the securing means released. The user then reinstalls the toilet. The water filled toilet dolly is then carried to a location suitable for draining the water.

It should be noted that since the handle 100 is, preferably, attached to the first end wall 40 and the water reservoir entrance 20 is located proximate the same first end wall 40, when the dolly is lifted by the handle 100 a larger capacity for water is achieved than with a device having the water reservoir entrance 20 positioned centrally in the top panel. Also, since, preferably, the drain 95 is located proximate the second end wall 42, when the dolly stands on the second end wall 42 and the drain opened 95 the water will drain with efficiency.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. A device for transporting and draining a toilet fixture having a pedestal base with a floor mounting surface having a flush water port exiting through said floor mounting surface and at least one floor bolt receiving aperture piercing said base, comprising:
   a) a generally hollow body surrounding a water reservoir, wherein said body has a top panel with upper and lower surfaces completely penetrated by a water reservoir entrance, a bottom panel with upper and lower surfaces, and a perimeter side wall, wherein said perimeter side wall spans and connects said top and said bottom panels;
   b) a plurality of locking casters, wherein each said locking caster is secured to said bottom panel lower surface;
   c) a toilet mount for contacting said pedestal base floor mounting surface, wherein said toilet mount is fastened to said body top panel with said toilet mount comprising a perimeter flange having upper and lower surfaces joined to an open centered ring, wherein said ring is fitted within said top panel water reservoir entrance with said lower flange surface contacting said top panel upper surface; and
   d) means for securing said pedestal base to said toilet mount, whereby when said pedestal base mounting surface contacts said flange upper surface said flush water port aligns with said water reservoir entrance, wherein said securing means comprises an anchor member and an anchor member receiver secured within said body, wherein said anchor member passes through said pedestal base floor bolt receiving aperture and through a passage in said flange and said top panel to engage said anchor member receiver to secure said base to said body.

2. The toilet fixture transporting and draining device according to claim 1, wherein said anchor member is a male threaded bolt and said anchor member receiver is a female threaded block secured to said top lower surface.

3. A device for transporting and draining a toilet fixture having a pedestal base with a floor mounting surface having a flush water port exiting through said floor mounting surface and at least one floor bolt receiving aperture piercing said base, comprising:
   a) a generally hollow body surrounding a water reservoir, wherein said body comprises:
      an elongated top panel with two side borders, first and second end borders, and upper and lower surfaces completely penetrated proximate said first end border by a water reservoir entrance;
      an elongated bottom panel with two side borders, first and second end borders, and upper and lower surfaces;
      two side walls each with an upper border, a lower border, and first and second end borders; and
      first and second end walls each with an upper border, a lower border, and two side borders, wherein each said top panel border joins a said side wall upper border, each said bottom panel border joins a said side wall lower border, said first end wall upper border joins said top panel first end border, said first end wall lower border joins said bottom panel first end border, said second end wall upper border joins said top panel second end border, and said second end wall lower border joins said bottom panel second end border to generate an essentially liquid tight water reservoir;
   b) a plurality of locking casters, wherein each said locking caster is secured to said bottom panel lower surface;
   c) a toilet mount for contacting said pedestal base floor mounting surface, wherein said toilet mount is fastened to said body top panel proximate said first end wall with said toilet mount comprising a perimeter flange having upper and lower surfaces joined to an open centered ring, wherein said ring is fitted within said top panel water reservoir entrance with said lower flange surface contacting said top panel upper surface; and
   d) means for securing said pedestal base to said toilet mount, whereby when said pedestal base mounting surface contacts said flange upper surface said flush water port aligns with said water reservoir entrance, wherein said securing means comprises an anchor member and an anchor member receiver secured within said body, wherein said anchor member passes through said pedestal base floor bolt receiving aperture and through a passage in said flange and said top panel to engage said anchor member receiver to secure said base to said body.

4. The toilet fixture transporting and draining device according to claim 3, wherein said anchor member is a male threaded bolt and said anchor member receiver is a female threaded block secured to said top lower surface.

* * * * *